March 7, 1967 R. L. SHAUM 3,308,373

LINE VOLTAGE LIMITER

Filed Feb. 18, 1964 2 Sheets-Sheet 1

INVENTOR.
Richard L. Shaum
BY
Roland A. Anderson
ATTORNEY

LINE VOLTAGE LIMITER

Filed Feb. 18, 1964 2 Sheets-Sheet 2

INVENTOR.
Richard L. Shaum
BY
Roland A. Anderson
ATTORNEY

United States Patent Office 3,308,373
Patented Mar. 7, 1967

3,308,373
LINE VOLTAGE LIMITER

Richard L. Shaum, Albuquerque, N. Mex., assignor, by mesne assignments, to the United States of America as represented by the United States Atomic Energy Commission Filed Feb. 18, 1964, Ser. No. 345,816
12 Claims. (Cl. 323—22)

This invention relates to a line voltage limiter and more particularly to improved apparatus for bi-lateral and symmetrical limiting of an alternating current waveform which is being transmitted to a load.

Line voltage limiters are required to protect electrical load machinery against transient or steady state overvoltages or surges arising either from the source or the load.

Prior devices including regulating transformers have left much to be desired. In general the prior devices if inductive are frequency dependent and have a slow response because of the inductive lagging current. Such devices can operate at substantially only one frequency and are somewhat ineffective against transients. In addition, prior devices have required that a large portion of the transmitted power be dissipated in the limiter so that only a small portion of the transmitted power reaches the load; thus such limiting apparatus is both large and inefficient for its designed power level.

The present invention has overcome these disadvantages. A line voltage limiter is provided which is substantially independent of frequency, dissipates appreciably less than 10% of load power under normal conditions, limits both halves of the A.C. wave symmetrically and is limited in its power handling capabilities only by the instantaneous current and voltage rating of its components.

Accordingly, it has been an object of this invention to provide improved voltage limiting apparatus.

The instant invention in one aspect provides a limiter circuit for connection in series with the lines between the source and load in which the limiter has at least two transistors connected in series opposition with one transistor in each line and with each transistor shunted by a diode which is oppositely poled from its associated transistor. Thus alternating current may flow to the load on one half cycle through one transistor and diode and on the other half cycle through the other transistor and diode. Bias means assures the saturation of the transistors to provide maximum power transfer to the load. Limiting is provided by a reference voltage source which is connected between the bases of the two transistors. When the input line voltage exceeds the reference voltage on either half cycle, the reference source breaks down, and the reference voltage appears at the load.

Another important aspect of this invention is the use of cascaded emitter follower amplifier whereby only a small percentage of the supply current is required to provide limiting action.

An important aspect of this invention is the several embodiments of reference sources each of which operate to limit unwanted voltage on either or both halves of the A.C. cycle and do so symmetrically. By connecting the reference source to both transistor bases in a manner which compares both halves of the A.C. wave with the same reference voltage an over voltage is sensed by the reference and the transistor base voltages are clamped so that the load voltage equals the reference voltage.

Other objects and advantages of the present invention and its several embodiments will be apparent to those skilled in the art upon a reading of the following detailed description in which.

In describing the several embodiments of the invention the same reference numerals will be used to indicate the same part.

Figure 1:
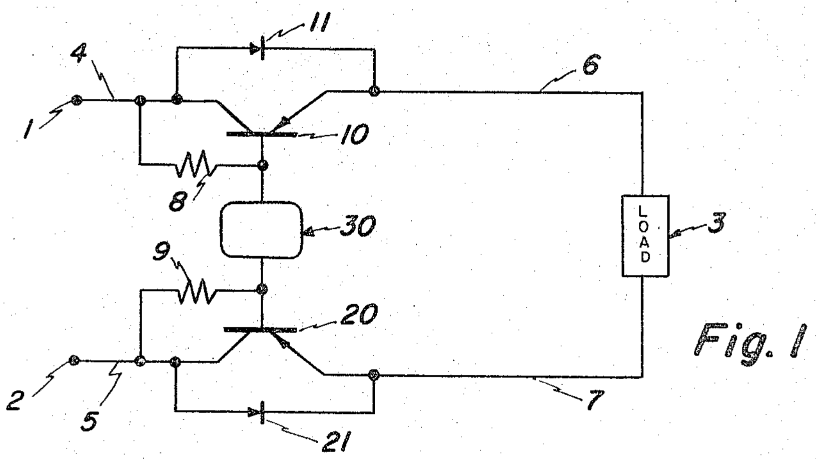
FIG. 1 is a schematic diagram of one form of the invention with a reference source in block diagram.

Referring now to FIG. 1 input terminals 1 and 2 are provided for connection to a 110 volt A.C. power supply. Load 3 is a resistor or may conventionally be a motor, amplifier or other apparatus. In series with input lines 4 and 5 and load lines 6 and 7 are two oppositely poled PNP transistors 10 and 20. A voltage reference source 30 is connected between the bases of 10 and 20. Diodes 11 and 21 are connected in shunt with transistors 10 and 20 respectively and oppositely poled therefrom. Bias resistors 8 and 9 are connected between the input lines 4 and 5 and the bases of 10 and 20 respectively. Reference voltage source 30 may have several forms as will be described subsequently in reference to the other figures of the drawing.

The operation of FIG. 1 is as follows. Assuming the source is positive at terminal 1, current flows on line 4, through diode 11, line 6, load 3, line 7, the emitter-base of transistor 20, and bias resistor 9 to the negative source at terminal 2. When the A.C. polarity reverses, the path of current flow is reversed and includes diode 21, the emitter-base of 10, load 3 and bias resistor 8.

Bias resistors 8 and 9 have a relatively large resistance and are selected so that during normal operation, the respective emitter-base current flow therethrough as described above generates a negative collector-base voltage sufficient to cause conduction and saturation of its respective associated transistor without dissipating much power.

With the bias developed across resistors 8 and 9 for the collector-base circuit, current flows from the emitter to collector circuit of transistors 10 or 20 on alternate halves of the A.C. cycle during normal operation.

Since the voltage drop across such a saturated transistor is of the order of .3 volt and since the load is alternately connected to source 1 and 2 through one or the other transistors and a diode, the voltage at the load is a substantial replica of the input.

Now the purpose of the reference voltage source 30 is to prevent excess voltages from reaching the load by providing a voltage which is alternating between the bases of the transistors 10 and 20, in synchronism with the line voltage and which is effective only when the line voltage exceeds the reference voltage. The various embodiments and the mode of operation of several reference sources will be described subsequently.

One problem with transistors which has limited their use in power circuits is that assuming they can withstand the required current or voltage, they break down at high continuous excursions of both at the same time. However, in FIG. 1 in normal operation the transistors are highly conducting so that the voltage across the transistor is very low, and usually less than 1 volt. It is only for the instant that the input voltage exceeds the reference voltage that one of the transistors becomes a high impedance and has substantial voltage developed across it. Thus the transistors may operate at their peak voltage and current ratings and are limited only by the instantaneous breakdown values rather than their continuous breakdown values which are considerably lower.

Figure 2:
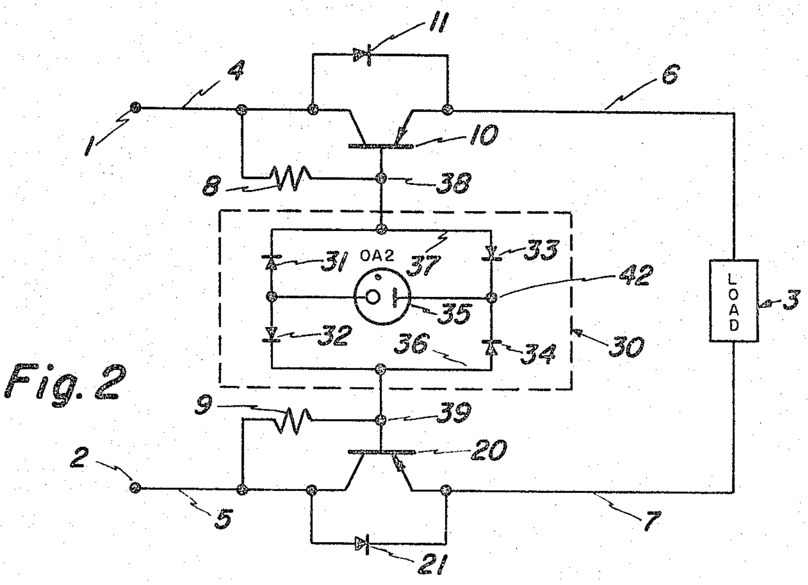
FIG. 2 is schematic such as FIG. 1 with a one form of the reference source in schematic form.

FIG. 2 is identical with FIG. 1 but shows one form of reference voltage source 30 in schematic form. Reference source 30 includes diodes 31, 32, 33, and 34 connected in a bridge circuit with a conventional voltage regulator VR tube 35. Such voltage regulator tubes are normally non-conductive and when broken down at some predetermined voltage value they maintain substantially the same voltage regardless of current flow variations.

In normal operation with a VR tube which conducts at 150 volts, as the A.C. voltage at 1 and 2 varies in amplitude sinusoidally but less than 150 volts (peak to peak) for example, transistors 10 and 20 conduct on alternate halves of the cycle as previously described. Thus the load voltage on lines 6 and 7 varies sinusoidally and is a replica of the input voltage. Since the voltage drop across conducting transistors and diodes is very small and since the transistor base voltage is substantially equal to the transistor emitter voltage, the voltage at junctions 38 and 39 is substantially the same as that at the load or at the A.C. input on 1 and 2.

The source 30 provides two shunt paths across the A.C. line with a common connection through both bias resistors 8 and 9 and VR tube 35 to provide bi-directional current flow therethrough. For example, if terminal 1 goes negative and terminal 2 is positive above 150 volts for example, diode 21 and transistor 10 are conducting and the VR tube will break down and current will flow from 2 through diode 21 and the emitter-base of 20 to junction 39, line 36, diode 34, VR tube 35, diode 31, line 37, junction 38, and bias resistor 8 to terminal 1. Thus any voltage in excess of 150 volts (peak to peak) is developed across bias resistor 8. The voltage across the load is thus limited to the regulated voltage between junctions 38 and 39.

On the opposite half of the cycle when terminal 2 is negative and terminal 1 is positive about 150 volts, current flows through the other shunt path including diodes 32 and 33, VR tube 35 and bias resistor 9. The voltage between junctions 38 and 39 has reversed and again appears at the load. Thus voltages in excess of 150 volts on either half of the cycles are limited bilaterally and symmetrically by the breakdown of the VR tube with the development of the excess voltage across the bias resistors and with the alternating reference voltage appearing at the load.

It should be noted that for normal line voltages, transistors 10 and 20 conduct alternately when the voltage at their collectors is negative, but that for voltages above the normal voltage (or at a desired clipping level) the excess voltage is dissipated by the normally conducting transistor for a particular polarity of input voltage. For example, when terminal 1 is negative below 150 volts, transistor 10 is normally conducting and transistor 20 is normally non-conducting. If terminal 1 is negative above 150 volts, the excess voltage is dropped across bias resistor 8 because of the shunt path through diode 21, the emitter-base of 20, reference 30, and junction 38. On the opposite half cycle the reverse occurs and any excess voltage is developed across bias resistor 9. By using large bias resistors only a small current is required to provide this limiting action.

In reference to FIG. 2, a zener diode may be substituted for the VR tube 35; the anode of the zener diode would be connected to the junction of diodes 31 and 32 at junction 41 and its cathode would be connected at the junction of diodes 33 and 34 at junction 42 so that the zener diode breaks down in the reverse direction of normal current flow. The VR tube has the advantages of being relatively inexpensive and having large current handling capacity while zener diodes are available for operation at a great number of practical desired voltage breakdown or limiting levels at usually lower current levels.

Figure 3:
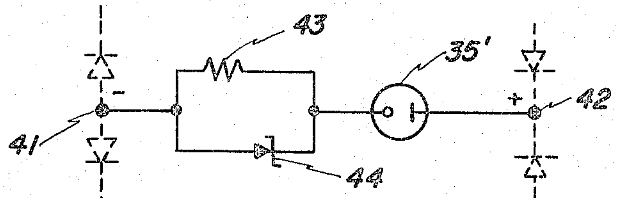
FIGS. 3, 4, and 6 show schematic diagrams of modifications of the reference source of FIGS. 2 and 5.
Figure 4:
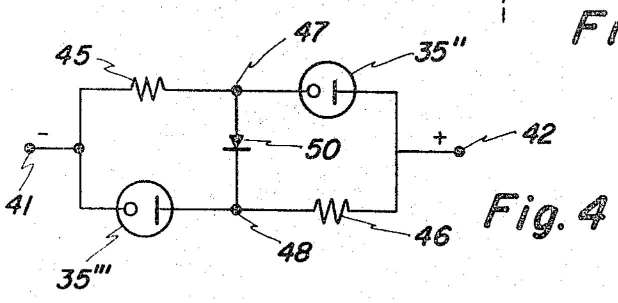
Figure 6:
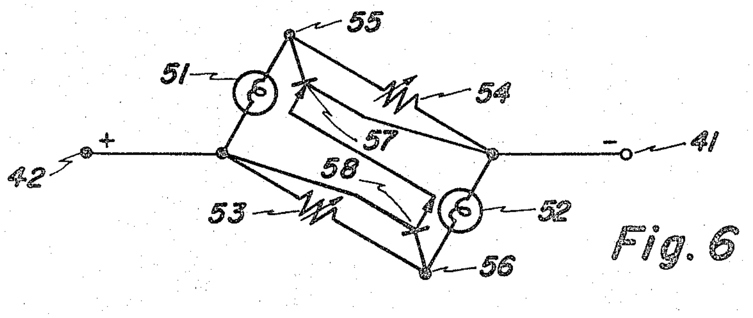

The circuit of FIG. 2 could be further modified by substituting the circuits of FIGS. 3, 4, or 6 between terminals 41 and 42 in FIG. 2 for the voltage regulator tube 35 of FIG. 2.

One of the problems with a voltage regulator such as 35 in FIG. 2 is that they require a firing voltage higher than the regulating voltage; for example it may require 170 volts to fire such a tube and after firing the voltage across the tube will drop to 150 volts. From one point of view it may be considered that the regulation is delayed. To overcome this delay in firing the substitution of FIG. 3 for 35 in FIG. 2 will provide "earlybird" regulation for a conventional 120 volt A.C. line (R.M.S.) whereas FIG. 4 will provide earlybird regulation for a conventional 208 volt A.C. line. The peak to peak voltages are approximately 170 and 300 volts respectively.

Now with the circuitry of FIG. 2 as modified by FIG. 3, as the line voltage rises to its normal level of 170 volts peak to peak, at terminals 41 and 42, VR tube 35′ will break down and conduct. Immediately thereafter the voltage drop across 35′ is 150 volts and 20 volts is across resistor 43. Thus VR tube 35′ breaks down "early" on every A.C. half cycle even though no excess voltage has yet occurred. Zener diode 44 is selected to break down at 24 volts. Now if the line voltage at 41 and 42 increases due to a transient etc., the excess voltage above 170 will appear across resistor 43. When the line voltage exceeds 174 volts, the 24 volt drop across resistor 43 will break down zener diode 44, and thus a reference voltage source of 174 volts has been provided for the load as described in FIG. 2.

In the modification as shown in FIG. 4 as applied to a 208 volt A.C. input line (300 volt P.P.) two VR tubes 35″ and 35‴ are connected in parallel through resistors 45 and 46. As the A.C. input voltage rises to 170 volts both of the VR tubes fire in parallel. As the input line voltage reaches 300 volts, both VR tubes are connected in series through diode 50.

In the normal operation of FIG. 4, terminal 41 is always negative A.C. and terminal 42 is always positive A.C. because of the diode bridge connection in FIG. 2. Below 150 volts there is no current flow between 41 and 42 because this is below the ignition voltage of 35″ and 35‴. At 170 volts 35″ and 35‴ break down in parallel through resistors 46 and 45 respectively. Above 150 volts the excess voltage drop increases across resistors 45 and 46 in proportion to the increasing line voltage at 41 and 42. As the line voltage goes above 300 volts, the voltage at junction 47 is more positive than the voltage at junction 48 so that diode 50 breaks down with VR tubes 35″ and 35‴ in series.

Figure 5:
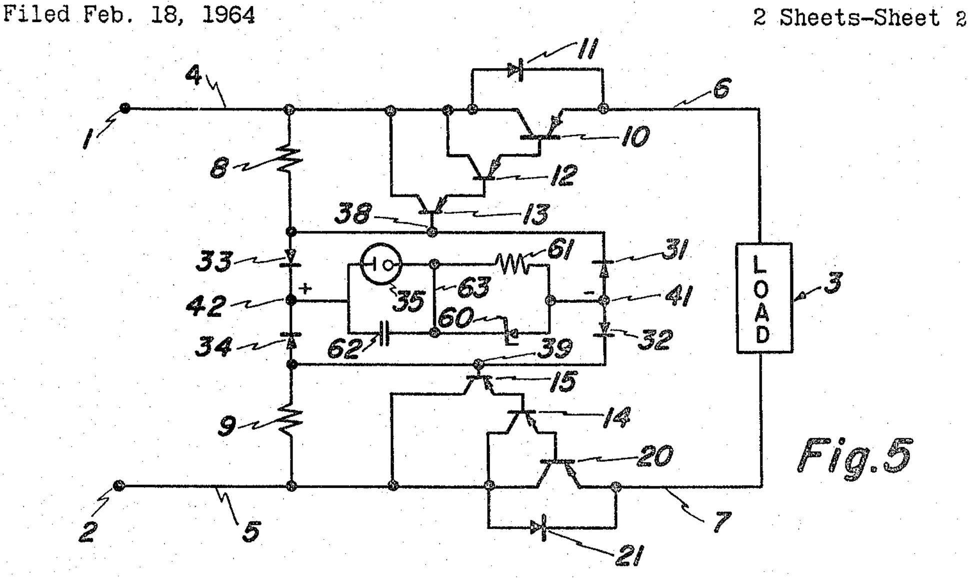
FIG. 5 shows a second embodiment of the invention.

FIG. 5 shows a complete embodiment of a preferred form of the invention which is designed to clip above 124 volts R.M.S. at loads up to 1 kilowatt. The circuitry includes many of the features previously discussed in FIGS. 1–4.

Transistors 10, 12, and 13 provide one emitter-follower amplifier and transistors 20, 14, and 15 provide a second emitter-follower. The small emitter-base current of transistors 13 and 15 are amplified to provide increased current to the emitter-base of transistors 12 and 14 to provide increased current flow to the load through transistors 10 and 20.

The reference voltage source 30 of FIG. 5 includes the diode bridge of FIG. 2 but differs therefrom in the use of VR tube 35, zener diode 60, resistor 61 and condenser 62 between terminals 41 and 42 to provide a preferred form of "earlybird" circuit.

As the normal A.C. line voltage rises to its peak, VR tube 35 fires. As the voltage across the VR tube drops below its firing voltage, this voltage appears across resistor 61. Any transient will increase the voltage across resistor 61 to breakdown zener diode 60 in its reverse direction. Thus VR tube 35 is in series with diode 60 over line 63 to provide a voltage at junctions 41 and 42 which is the sum of the voltage drops across 35 and 60.

FIG. 6 illustrates another substitute form of the reference source for connection between lines 41 and 42. As the positive A.C. line voltage pulses appear at 42, current flows through two current paths including lamps 51 and 52 and resistor 54 and 53.

Because of the cold resistance of lamps 51 and 52, the voltage at junctions 55 and 56 lags the line voltage. As the normal A.C. line voltage starts to rise toward its peak most of the voltage is developed across resistors 53 and 54 so that junction 55 is more positive than junction 56; as a result PNP transistor 57 and NPN transistor 58 are non-conductive. As the A.C. line exceeds its normal peak, junction 55 goes negative with respect to junction 56 and both transistors conduct in series to effectively shunt out such peaks. Resistors 53 and 54 are variable to provide an easily adjustable limiting voltage. This system would be most suitable for low voltage limits. When in series with previously described arrangements it would afford a narrow range of variations.

Figure 7:
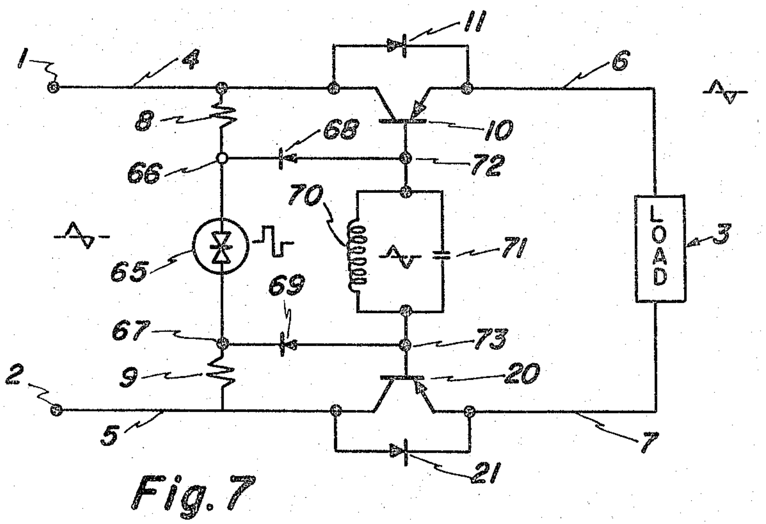
FIG. 7 shows a third embodiment of the invention.

FIG. 7 shows a line voltage regulator which differs from the limiters previously described in that a tuned A.C. reference source is connected between the bases of transistors 10 and 20 which is sync with and substantially the same amplitude as the line voltage.

In FIG. 7 double anode zener diode 65 is in series with bias resistors 8 and 9 across the A.C. line and limits the peaks of both halves of the wave; thus the voltage between junctions 66 and 67 is substantially a square wave with an amplitude less than the line voltage. As the A.C. input varies sinusoidally, current will flow through the tuned circuit including inductance 70 and condenser 71 by way of diodes 68 and 69.

As the A.C. input voltage rises above its normal amplitude either transiently or continuously, the tuned circuit voltage at junctions 72 and 73 is greater than at 66 and 67 to thereby block diodes 68 and 69; consequently the tuned circuit is no longer loaded by the limiter and oscillates freely to provide a sinusoidal reference source varying at the A.C. line frequency between the bases of transistors 10 and 20.

While I have shown several preferred embodiments of my invention, those skilled in the art will recognize that there are equivalents which may be substituted for some components of my invention. Accordingly, my invention is defined by the following claims.

I claim:

1. A line voltage limiter comprising means including first and second lines for connection to a conventional source of power, first and second output terminal means for connection to a load, first transistor means having its emitter collector circuit connected for conducting current between said first line and first terminal, second transistor means having its emitter collector circuit connected for conducting current between said second line and said second terminal, first impedance means connected between the collector and the base of the first transistor, second impedance means connected between the collector and the base of the second transistor, a source of reference potential connected between the bases of the two transistors, first rectifier means connected in shunt with the emitter collector circuit of said first transistor and being oppositely poled therefrom, second rectifier means in shunt with the emitter collector circuit of said second transistor and oppositely poled therefrom, whereby said transistors are alternately conducting current from the source to the load for input voltages less than the reference voltage and in which current is shunted across the load and through said reference voltage source for input voltages in excess of said reference voltage.

2. Apparatus as in claim 1 further including third and fourth transistors, means for connecting said first, third, and fourth transistors in a cascaded emitter follower circuit in that order, means for connecting the collector electrodes of said first, third, and fourth transistor to the first line, and means for connecting the base of the fourth transistor to said reference source.

3. Apparatus as in claim 1 in which said reference source includes a voltage regulator tube, third and fourth rectifier means connected in series with said voltage regulator between the bases of said first and second transistors and poled for conducting current from the second line to the first line, and fifth and sixth rectifier means connected in series with said voltage regulator tube between the bases of the first and second transistor and poled for conducting current from said first to said second line, whereby a single voltage regulator tube provides a reference voltage for limiting voltage on both lines.

4. Apparatus as in claim 1 in which said reference source includes a voltage regulator tube and a zener diode in series, between the bases of the first and second transistors, and resistive means connected in shunt with said zener diode.

5. Apparatus as in claim 4 further including diode means connected in series with said voltage regulator and zener diode between said bases for conducting current from said first line to the second line, and further diode means connected in series with said voltage regulator and zener diode between said bases for conducting current from the second line to the first line.

6. Apparatus as in claim 1 in which said reference source includes third and fourth terminals connected to the base of the first and second transistors respectively, a first voltage regulator tube having its anode connected to third terminal and its cathode connected through an impedance to the fourth terminal, a second voltage regulator tube having its cathode connected to the fourth terminal and its anode connected through an impedance to the third terminal, and limiting diode means connected between the cathode of the first regulator tube and the anode of the second regulating tube whereby for low voltages the two voltage regulators are in parallel and for high voltages they are in series.

7. Apparatus as in claim 1 in which said first transistor means includes a PNP transistor having its collector connected to the first line and its emitter connected to the first output terminal, and said second transistor means includes a PNP transistor having its collector connected to the second line and its emitter connected to the second output terminal.

8. Apparatus as in claim 7 in which said first rectifier is connected with its anode connected to the first line and its cathode connected to the first output terminal, and in which the second rectifier is connected with its anode to the second line and its cathode to the second output terminal.

9. Apparatus for limiting alternating current output voltages to substantially 125 volts R.M.S. comprising first and second lines for receiving alternating current input voltages, first, second, and third, transistors connected in an emitter follower circuit in the above sequence, fourth, fifth, and sixth transistors connected in an emitter follower circuit in the above sequence, first and second output terminals for connection to a load, means for connecting the collectors, of the first, second and third transistors to the first line, means for connecting the collector of the fourth, fifth, and sixth transistors to the second line, means for connecting the emitters of the first and fourth transistors to the first and second output terminal respectively, first rectifier means connected in shunt with the emitter collector circuit of said first transistor and being oppositely poled therefrom, second rectifier means in shunt with the emitter collector circuit of said second transistor and oppositely poled therefrom, a series circuit including a voltage regulator tube and zener diode, resistive means in shunt with said zener diode, resistance means connected to the first line and the base of the third transistor, resistance means connected between the second line and the base of the sixth transistor, and rectifier means connected between said series circuit and the bases of the third and sixth transistor for permitting bi-directional current flow between said bases.

10. Apparatus for limiting an A.C. output voltage to substantially 208 volts R.M.S. comprising first and second lines for receiving A.C. voltages larger than 208 volts, first and second output terminals for connection to a load, first transistor connected in series between the first line and first output terminal, second transistor connected between the second line and second output terminal, first and second emitter follower circuits for connection to the emitter-base circuit of a first transistor, third and fourth emitter follower circuits for connection to the emitter-base circuit of the escond transistor, each of said emitter follower circuits having an input, first rectifier means connected in shunt with the emitter collector circuit of said first transistor and being oppositely poled therefrom, second rectifier means in shunt with the emitter collector circuit of said second transistor and oppositely poled therefrom, a bridge circuit including first and second voltage regulator tubes in diagonally opposite arms of the bridge and impedances in the other diagonally opposite arms of the bridge, rectifier means for connecting said voltage regulators in series, resistive means for connecting the first line to the inputs of the first and second emitter followers, resistive means for connecting the second line to the inputs of the third and fourth emitter followers and rectifier means for permitting bi-directional current flow between the emitter follower inputs through the voltage regulators.

11. Apparatus as in claim 1 in which said reference source includes a bridge circuit said bridge circuit including lamp impedances in opposite arms thereof and resistive impedances in the remaining arms, and means for connecting said bridge circuit between the bases of said transistors for sensing the line voltage with said lamps and for shunting the lines when the line voltage as so sensed exceeds a predetermined value.

12. Apparatus as in claim 1 in which said reference source includes a tuned circuit connected between the bases of said transistors, and means including a double-based zener diode means connected across said lines and across said tuned circuit for permitting oscillation of said tuned circuit when the line voltage exceeds the breakdown value of said zener diode.

No references cited.

JOHN F. COUCH, *Primary Examiner.*

K. D. MOORE, *Assistant Examiner.*